United States Patent
He (10) Patent No.: US 7,289,733 B1
(45) Date of Patent: Oct. 30, 2007

(54) HIGH REFLECTION ISOLATION OPTICAL DEVICES AND THE METHOD FOR MAKING THE SAME

(75) Inventor: Chun He, Frement, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 639 days.

(21) Appl. No.: 10/838,082

(22) Filed: May 3, 2004

(51) Int. Cl.
*H04J 14/02* (2006.01)
(52) U.S. Cl. .......................................... 398/85; 398/82
(58) Field of Classification Search ............ 398/82–83, 398/85
See application file for complete search history.

(56) References Cited

U.S. PATENT DOCUMENTS

| | | | |
|---|---|---|---|
| 5,629,995 A | 5/1997 | Duck | |
| 5,920,411 A * | 7/1999 | Duck et al. | 398/85 |
| 6,188,816 B1 | 2/2001 | Solheim | |
| 6,198,857 B1 | 3/2001 | Grasis | |
| 6,466,341 B1 | 10/2002 | Lumish | |
| 6,661,944 B1 * | 12/2003 | Lin et al. | 385/24 |
| 6,842,559 B1 * | 1/2005 | Florence | 385/24 |
| 7,013,069 B1 * | 3/2006 | He et al. | 385/47 |
| 2001/0055442 A1 | 12/2001 | Whitehead | |
| 2003/0228101 A1 | 12/2003 | Tai | |

* cited by examiner

Primary Examiner—Leslie Pascal
(74) Attorney, Agent, or Firm—Joe Zheng (57) ABSTRACT

New designs of optical devices, particularly for adding or dropping a selected wavelength or a group of wavelengths as well as multiplexing a plurality of signals into a multiplexed signal or demultiplexing a multiplexed signal into several signals are disclosed. According to one aspect of the present invention, a reflected light beam from an optical filter is caused to go through the same optical filter at least one more time to minimize a residual signal embedded in the reflected light beam, wherein the residential signal is caused by the imperfect spectral characteristics of the optical filter. According to another aspect of the present invention, a reflective element is so positioned that the reflected light beam is bounced back to the optical filter. When the reflective element is another optical filter being substantially similar to that optical filter, the reflected light beam is equivalent to having transmitted. As a result, the residual signal in the reflected light beam is substantially minimized, resulting in great isolation for the R-channel from the T-channel.

24 Claims, 6 Drawing Sheets

HIGH REFLECTION ISOLATION OPTICAL DEVICES AND THE METHOD FOR MAKING THE SAME

BACKGROUND OF THE INVENTION

1. Field of the Invention

The invention is generally related to the area of optical communications. In particular, the invention is related to optical wavelength multiplexing and add/drop devices with high reflection channel isolation and the method for making the same.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

Optical add/drop and multiplexer/demultiplexer devices are those elements often used in optical systems and networks. For example, an exchanging of data signals involves the exchanging of matching wavelengths from two different sources within an optical network. In other words, an add/drop device can be advantageously used for the multichannel signal for dropping a wavelength while simultaneously adding a channel with a matching wavelength at the same network node. Likewise, for transmission through a single fiber, a plurality of channel signals are combined via a multiplexer to be a multiplexed signal that eventually separated or demultiplexed via a demultiplexer.

Figure 1A:
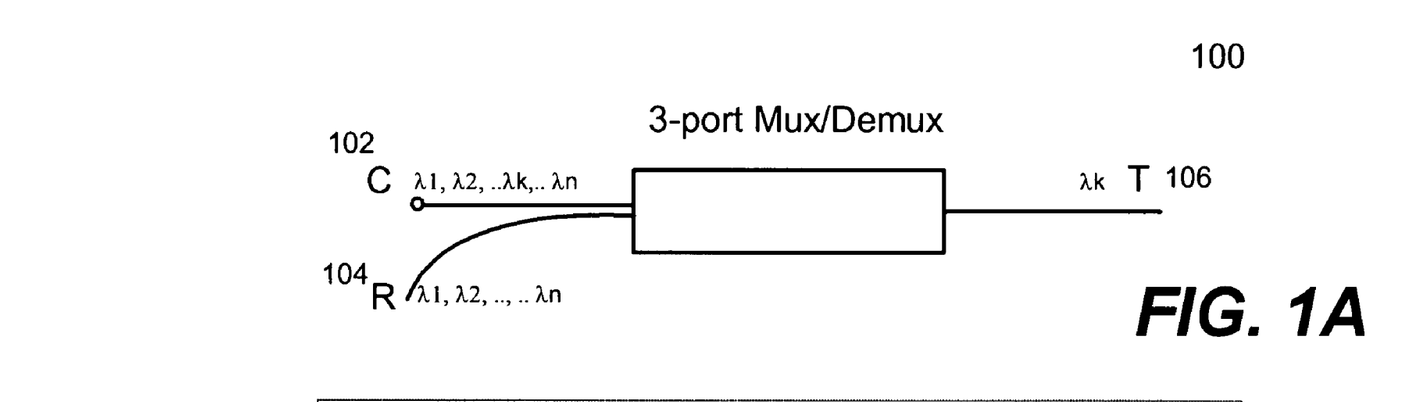
FIG. 1A shows a typical design of a three-port add/drop device.

A fundamental element in add/drop devices and multiplexer/demultiplexer is what is called a three-port device. As the name suggests, a three-port device has three ports, each for a multi-channel signal, a dropped or added signal or a multi-channel signal without the dropped or added signal. FIG. 1A shows a typical design of a three-port add/drop device 100. The optical device 100 includes a common (C) port 102, a reflection (R) port 104, and a transmission (T) port 106. When the device 100 is used as a multiplexer (i.e., to add a signal at a selected wavelength $\lambda_K$ to other signals at wavelengths other than the selected wavelength $\lambda_K$), the T-port 106 receives a light beam at the selected wavelength $\lambda_K$ that is to be multiplexed into a group of beams at wavelengths $\lambda_1, \lambda_2, \ldots \lambda_N$ excluding the selected wavelength $\lambda_K$ coupled in from the C-port 102. The R-port 104 subsequently produces a multiplexed signal including all wavelengths $\lambda_1, \lambda_2, \ldots \lambda_K, \ldots \lambda_N$.

Likewise, when the optical device 100 is used to demultiplex signals, the C-port 102 receives a group of signals with wavelengths $\lambda_1, \lambda_2, \ldots \lambda_K, \ldots \lambda_N$. The T-port 106 produces a signal with the selected wavelength $\lambda_K$ while the R-port 104 subsequently produces a group of signals including all wavelengths $\lambda_1, \lambda_2, \ldots, \lambda_N$ except for the selected wavelength $\lambda_X$. In general, the optical paths towards a R-port and a T-port are respectively referred to as R-channel and T-channel.

Figure 1B:
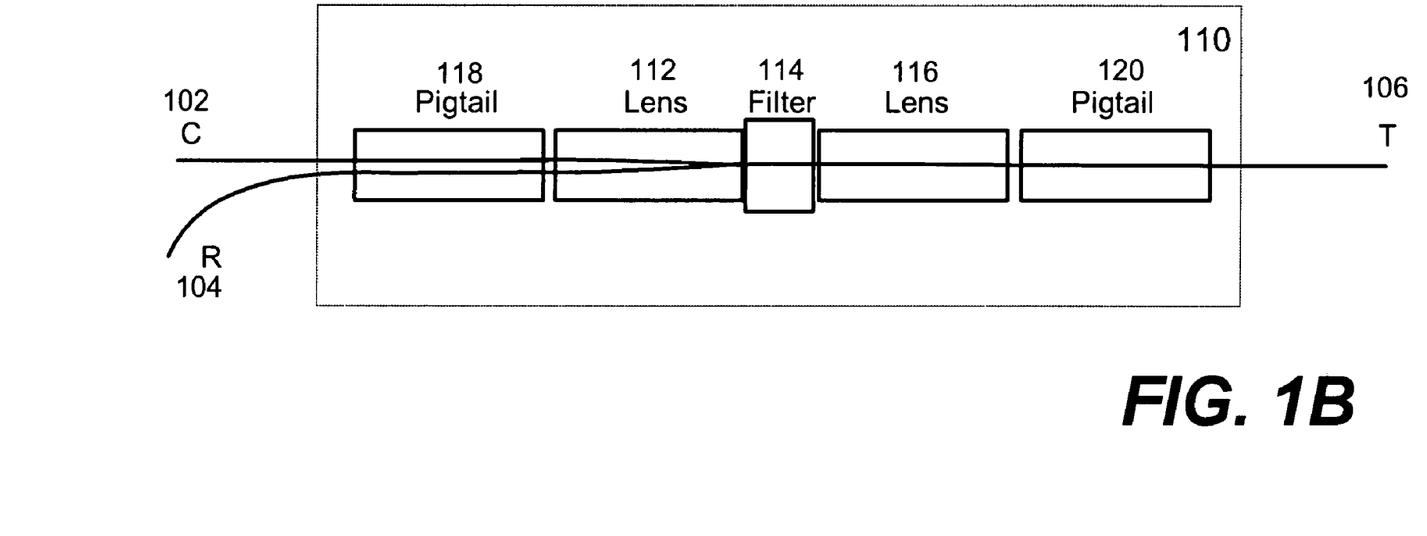
FIG. 1B shows an exemplary internal configuration of the optical device of FIG. 1A.

FIG. 1B shows an exemplary internal configuration 110 of the optical device 100 of FIG. 1A. As shown in FIG. 1B, there is a first GRIN lens 112, an optical filter 114 (e.g., a multi-layer thin film filter) and a second GRIN lens 116. In general, a dual-fiber pigtail is provided in a holder 118 (e.g., a dual-fiber pigtail collimator) and coupled to or positioned towards the first GRIN lens 112, and a single-fiber pigtail is provided in a second holder 120 and coupled to or positioned towards the second GRIN lens 116. Essentially the two GRIN lenses 112 and 116 accomplish the collimating means for coupling an optical signal with multi channels or wavelengths in and out of the C port 102, the R port 104, or the T port 106. In general, the three-port device 100 is known to have a very low coupling loss from the C-port to both the R-port and the T-port for use as a demultiplexing device, or vise versa as a multiplexing device.

Figure 2A:
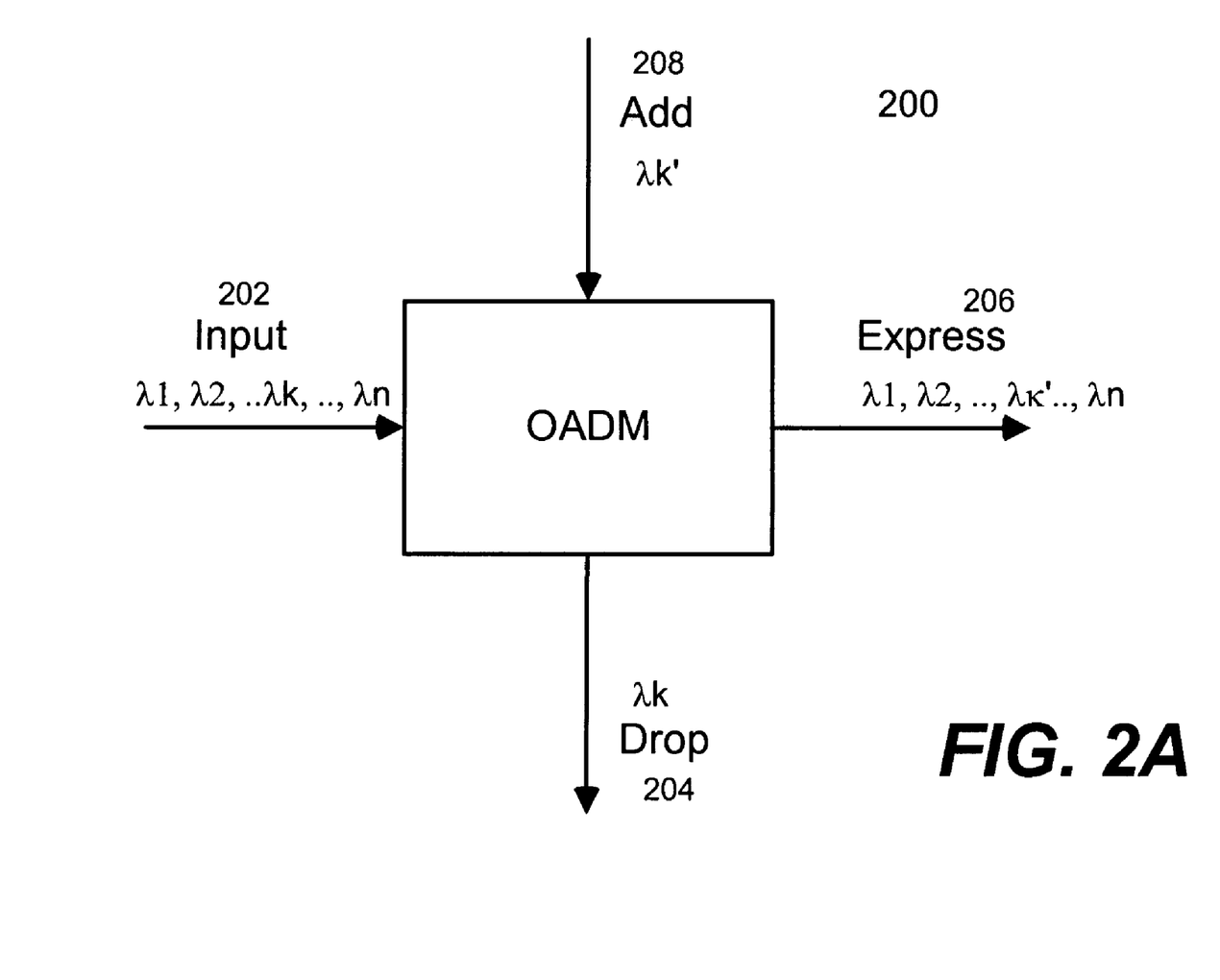
FIG. 2A shows a four-port device and respective functions of the four ports labeled, respectively.

As a result, the three-port device 100 is often used to assemble a four-port thin film interference filter based optical wavelength add/drop device. FIG. 2A shows a four-port add/drop device 200 and respective functions of the four ports labeled, respectively. An incoming network fiber provides a light beam including wavelength division multiplexed (WDM) optical signals, for example, with or at wavelengths $\lambda_1, \lambda_2, \ldots, \lambda_k, \ldots \lambda_n$, to an input port 202 of the device 200. A predetermined signal channel which is carried by a wavelength $\lambda_k$ is dropped, for example, to a local site for use through a drop port 204. At the same time, a new signal at a wavelength $\lambda_k'$ that is identical or substantially similar to the dropped wavelength $\lambda_k$ is coupled to an add port 208. A newly combined or multiplexed signal including wavelengths $\lambda_1, \lambda_2, \ldots, \lambda_k' \ldots \lambda_n$ is out from an express port 206.

Figure 2B:
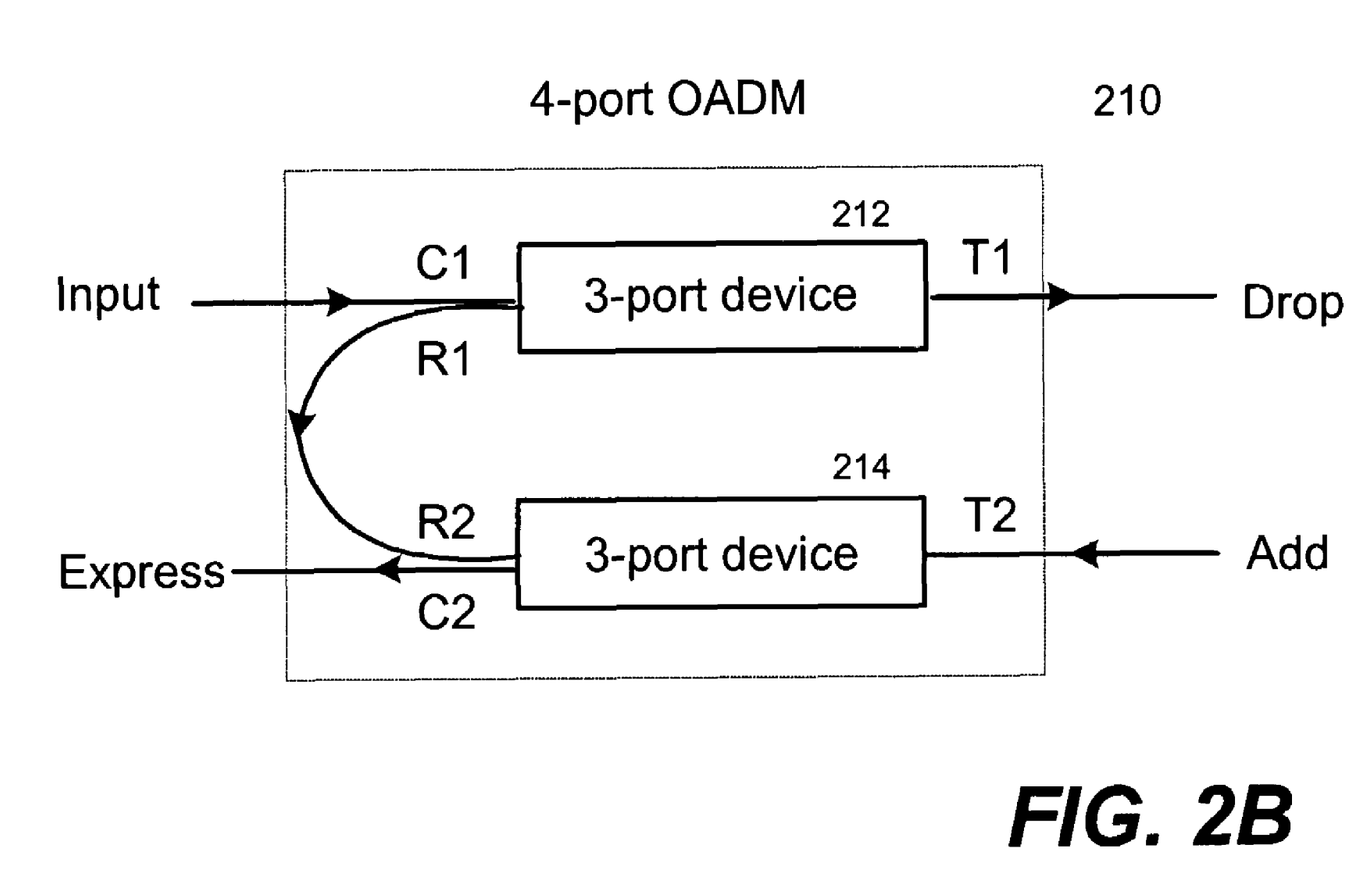
FIG. 2B shows an internal configuration employing two three-port devices, such as the one of FIG. 1B.

Traditionally, the four port device 200 is made by cascading two three-port devices. FIG. 2B shows an internal configuration 210 employing two three-port devices 212 and 214, such as the one 100 of FIG. 1B. Essentially, the three-port devices 212 and 214 are cascaded to form a four port add/drop device.

In general, the optical filters (e.g., thin film filter or TFF) can achieve nearly 100% reflection for the R-channel. For instance, TFF with a reflection index of 99.99% to 99.999% can be routinely achieved and commercially available. This is equivalent to 40 dB to 50 dB isolation for the T-channel from the R-channel. In other words, the mount of residual signal of the R channel transmitted through the TFF and mixed into the T-channel signal is −40 dB to −50 dB of the R-channel signal. The signal exiting the T-port of the 3-port device contains basically pure T-channel signal, with the R-channel signal residual of −40 dB to −50 dB of its original signal intensity.

However, the optical filters by the state-of-art TFF deposition technique can only achieve 97.5% to 99% transmission for the T-channel signal. This is equivalent to 15 dB to 20 dB isolation for the R-channel signal from the T-channel signal. The signal exiting the R-port of the 3-port device contains not only R-channel signal, but also some residual of the T-channel signal that can be of −15 dB to −20 dB of its original signal intensity. As a result, the residual of the T-channel signal would interfere with the R-channel signal, especially when a new signal is added into the transmission fiber that is using the same T-channel optical carrier signal, leading to complexity and difficulty when processing the R-channel signal.

Figure 3:
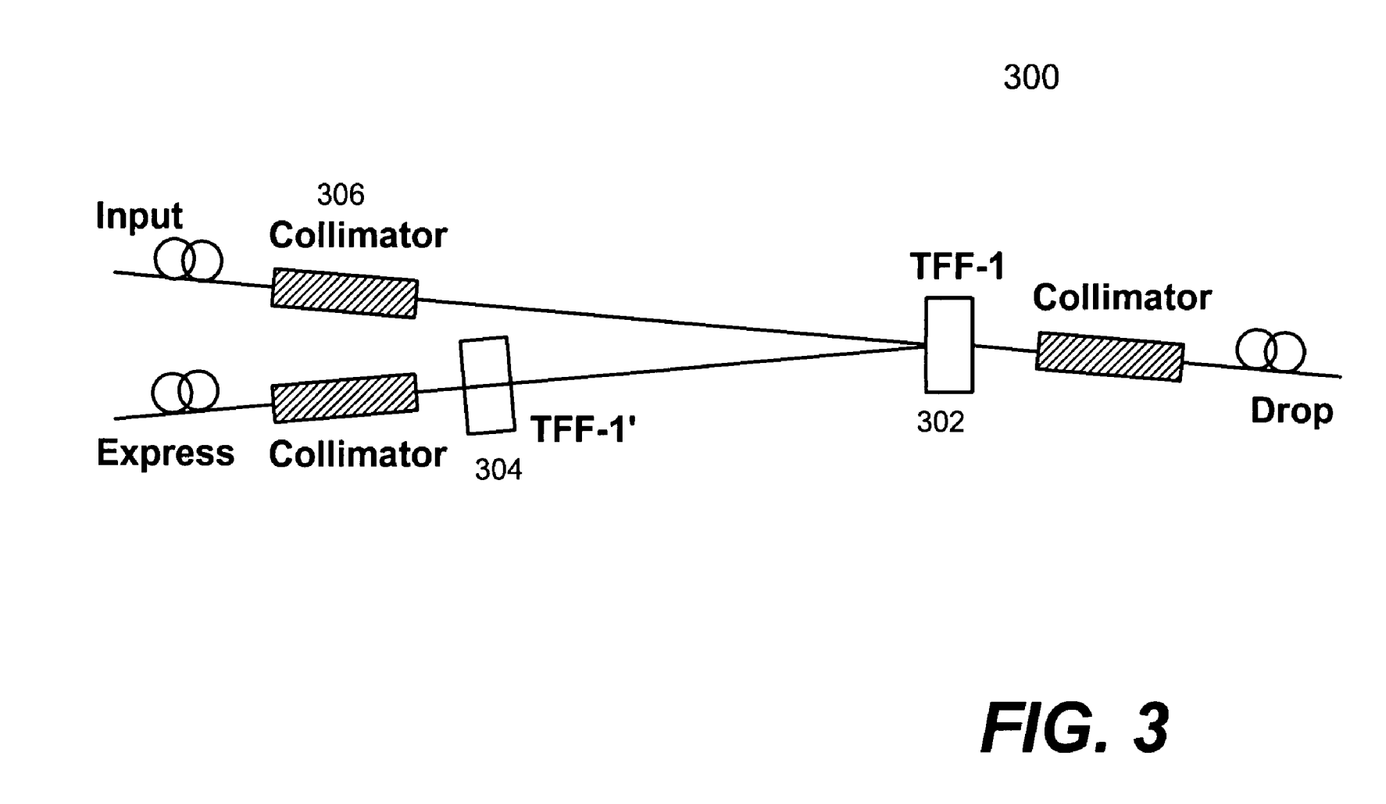
FIG. 3 shows a common approach using a pair of conjugate filters with the corresponding spectral characteristics reciprocal to each other to increase the isolation fro the R-channel from the T-channel.

To increase the isolation for the R-channel signal from the T-channel signal, several methods have been used for removing the T-channel signal residual in the R-channel signal. One approach that is commonly adopted is to use a pair of conjugate filters with the corresponding spectral characteristics are reciprocal to each other. FIG. 3 shows one of the practical implementation of the above idea. The filters 302 and 304 are deposited with multiplayer coatings to allow transmitting only wavelength λ1 and λ2, respectively. When a light beam including signals at various wavelengths including λ1 and λ2 is coupled by the collimator 306 to the filter 302, a substantial portion of the signal at λ1 passes the filter 302, and at the same time, nearly all the signal λ2 and the residual portion of λ1 are reflected to the filter 304. The reflected light beam then impinges upon the filter 304 that transmits only a signal at λ2. As a result, the signal at λ2 is pure and is isolated from possible interference. Although this approach increases the R-channel isolation, this approach demands stringent assembling tolerance and technical challenge. In addition, the high isolation device build in such way suffers high cost and bulky size.

Accordingly, there is a great need for techniques for providing high isolation from the T-channel channel such that the errors or residuals to the R-channel are minimized. The devices so designed are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths as well as multiplexing a plurality of signals into a multiplexed signal or demultiplexing a multiplexed signal into several signals. For simplicity, a group of selected wavelengths or channels will be deemed or described as a selected wavelength hereinafter. According to one aspect of the present invention, a reflected light beam from an optical filter is caused to go through the same optical filter at least one more time or a substantially similar optical filter to minimize a residual signal embedded in the reflected light beam, wherein the residential signal is caused by the imperfect spectral characteristics of the optical filter. According to another aspect of the present invention, a reflective element is so positioned that the reflected light beam is bounced back to the optical filter. When the reflective element is another optical filter being substantially similar to that optical filter, the reflected light beam trespasses essentially an optical filter at least twice. As a result, the residual signal in the reflected light beam is substantially minimized, resulting in great isolation for the R-channel from the T-channel.

The present invention may be used in many areas such as optical communications and devices. For example, devices designed in accordance with the present invention can be used in applications of fiber to home, where in both the optical network unit (ONU) in a user end, as well as the optical line termination (OLT) in the network transmission end, high isolations between the high intensity video signal and the bi-directional downstream and upstream voice/data signals are highly demanded.

The present invention may be implemented in many ways as a subsystem, a device or a method. According to one embodiment, the present invention is an optical apparatus comprising, an optical filter configured to transmit a light signal at a selected wavelength; a first collimator receiving a light beam including signals respectively at a plurality of wavelengths including the selected wavelength, the collimator coupling the light beam to the optical filter that passes a substantial portion of the signal at the selected wavelength, a reflective element receiving a reflected signal from the optical filter, the reflected signal including the signals at the wavelengths other than the selected wavelength and a residual signal at the selected wavelength, wherein the reflective element is so positioned that the reflected signal is redirected from the reflective element to the optical filter such that the residual signal at the selected wavelength is reduced again.

Depending on an exact implementation, the reflective element may be a mirror or another optical device having substantially identical characteristics of the original optical filter. When the reflected signal from the original optical filter impinges upon the another optical filter that passes the residual and reflects others in the reflected signal back to the original optical filter. As a result, the reduced residual in the reflected signal has been reduced at least three times.

One of the objects, features, advantages of the present invention is to provide a mechanism of high isolation for the R-channel from the T-channel channel such that the errors or residuals to the R-channel are minimized. The devices so designed are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to new designs of optical devices particularly useful for adding or dropping a selected wavelength or a group of wavelengths as well as multiplexing a plurality of signals into a multiplexed signal or demultiplexing a multiplexed signal into several signals. One of the important features in the present invention is to provide a mechanism for isolation of signals in one optical path from signals in another optical path. In particular, high isolation of the R-channel from the T-channel is provided in devices designed in accordance with the present invention to minimize errors or residuals in the R-channel signals.

According to one aspect of the present invention, a reflected light beam from an optical filter is caused to go through the same optical filter at least one more time or a substantially similar optical filter to minimize a residual signal embedded in the reflected light beam, wherein the residential signal is caused by the imperfect spectral characteristics of the optical filter. According to another aspect of the present invention, a reflective element is so positioned that the reflected light beam is bounced back to the optical filter. When the reflective element is another optical filter being substantially similar to that optical filter, the reflected light beam trespasses essentially an optical filter at least three times. As a result, the residual signal in the reflected light beam is substantially minimized, resulting in great isolation for the R-channel from the T-channel.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 4:
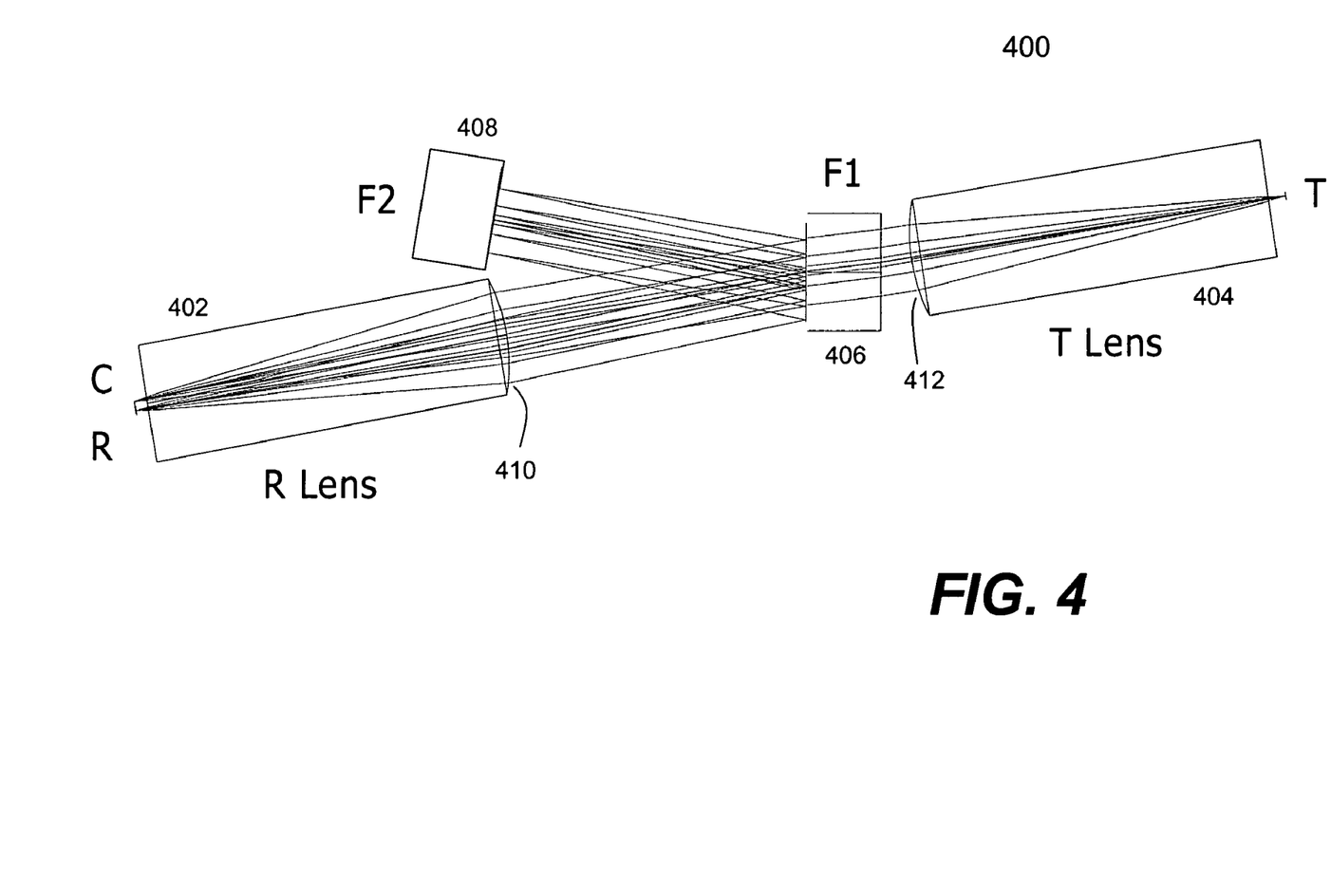
FIG. 4 shows an exemplary implementation according to one embodiment of the present invention.

Referring now to the drawings, in which like numerals refer to like parts throughout the several views. FIG. 4 shows an exemplary design 400 according to one embodiment of the present invention. One of the key features in the present invention is to provide high isolation of the R-channel from the T-channel. As shown in the design 400, by introducing a reflective element, a reflected light beam will pas through the same filter at least twice. In one perspective, errors or residuals in the reflected light beam can be reduced one more time by the same filter.

The design 400 includes a collimator 402 with a dual-fiber pigtail, a collimator 404 with a single-fiber pigtail, an optical filter 406 and a reflective element 408. Each of the collimators 402 and 404 has a lens referred to as R lens 410 and T lens 412. Depending on an exact implementation, the element 408 may be a mirror or another optical filter, each will be further explained below.

In operation, a multiplexed signal or a light beam is coupled to a fiber labeled by C in FIG. 4. The light beam including signals at various wavelengths $\lambda_1, \lambda_2, \ldots, \lambda_k, \ldots \lambda_n$ and transmits through the R lens 410 and impinges upon the optical filter 406. In one embodiment, the optical filter is a thin film filter. It is assumed that the optical filter 406 is configured to transmit a wavelength $\lambda_k$, thus a signal at wavelength $\lambda_k$ passes through the optical filter 406 and the rest of the signals at wavelengths at $\lambda_1, \lambda_2, \ldots \lambda_n$, excluding the wavelength $\lambda_k$, is reflected by the optical filter 406.

Unlike the setting, as shown in FIG. 1B, in which the optical filter 114 is positioned substantially perpendicular to the optical axis of the collimators 112 and/or 116, the filter 406 is slanted, namely some degrees (e.g., 10~45 degrees) rotated off the optical axis of the collimators 402 and/or 404.

As a result, the reflected light beam from the optical filter 406 impinges upon the reflective element 408.

Because of the imperfect isolation or imperfect spectral characteristics of the optical filter 406, a portion of the signal at wavelength $\lambda_k$ fails to pass through the optical filter 406 and, as an error or a residual, is added into the reflected signal. In one embodiment, the reflective element 408 is a mirror. Thus the reflected light beam is reflected back by the mirror 408 to the optical filter 406. The residual in the reflected light beam has a second chance to transmit through the optical filter 406 as the residual is indeed a portion of the signal at wavelength $\lambda_k$. The reflected light beam is again reflected by the optical filter 406 but this time with a substantially reduced residual in magnitude. According to one aspect of the present invention, the reflective element 408 is so positioned that a light beam reflected by the reflective element 408 impinges upon the filter 406 that redirects the reflected light beam to the R lens 410 that couples the twice-reflected light beam to the fiber labeled by R.

According to another embodiment, the reflective element 408 is another filter identical to the filter 406. Thus when the reflected light beam from the optical filter 406 impinges upon the optical filter 408, the residual in the reflected signal has a second chance to transmit through the optical filter 408 as the residual is indeed a portion of the signal at wavelength $\lambda_k$. At the same time, the reflected light beam is again reflected by the optical filter 408, but this time with a reduced residual in magnitude, to the optical filter 406 that again reduces the already reduced residual in magnitude and subsequently redirects the reflected light beam to the R lens 410 that couples the twice-reflected light to the fiber labeled by R.

It can be appreciated by those skilled in the art that one of the key features in the design 400 is to position a reflective element 408 that causes a reflected light beam to transmit through the same filter twice or another same kind of filter at least once to reduce errors or residuals in the reflected light beam so as to increase the isolation of the reflection channel from the transmission channel. According to one embodiment, if an optical filter gives a reflected signal of 20 dB isolation, then making the reflected beam passing through the filter twice doubles the reflected channel isolation to 40 dB. When two reflective elements are positioned in accordance with that of FIG. 4, the reflected signal can be caused to transmit through the same filter three times or another set of same kind of filters at least once, thus making three reflections and tripling the isolation.

According to one embodiment, the optical filter 406 is a standard WDM filter that is commonly used for making 3-port devices, and has typically ~20 dB reflection isolation. The T lens 412 may or may not be the same as the R lens 410. The respective backsides of the R lens 410 and T 412 lens have slanted angle of typically 8°, but can be set at other angles too, for the purpose to reduce light reflection from the lens 410 or 412. There are no restrictions on the distances between the R lens 410 and T lens 412 to the optical filter 406, the lens 410 or 412 to the mirror, and the distance between the filter 406 and the reflective element 408.

In addition, there is also no restriction on the beam incident angle onto the filter 406, and onto the reflective element 408. However, all the parameters can be selectively combined to achieve the performance as described above. In particular, by virtue of the present invention, the design 400 can achieve the lowest insertion loss to both R port and T port, the acceptable beam width, highest reflection isolation, smallest dead band between the transmission band and reflection band, and lowest polarization dependent loss. As described above, when the reflective element 408 is a filter, the reflection isolation can be tripled.

Figure 5:
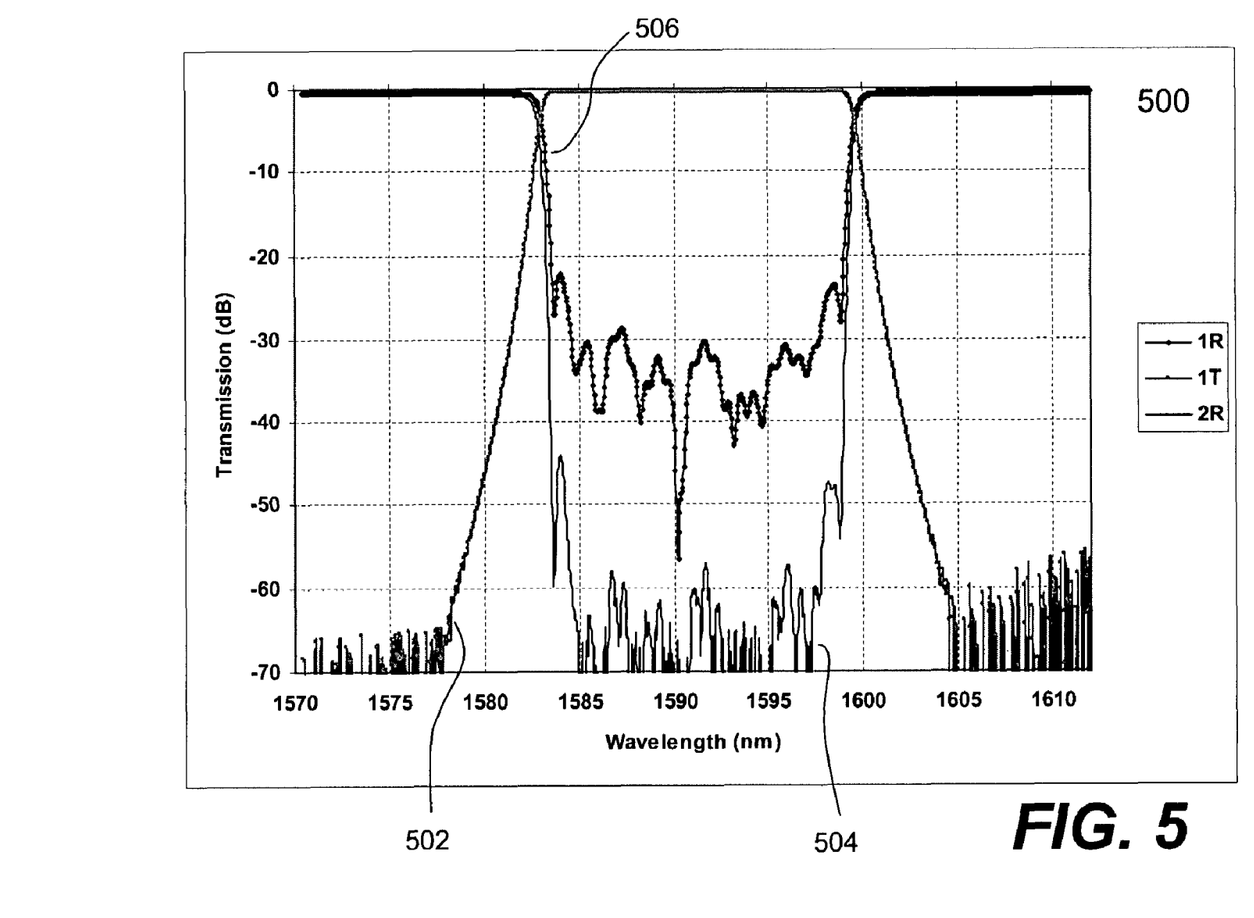
FIG. 5 shows respective reflected channel spectrums of a standard 3-port device in accordance with the present invention.

For illustration only, FIG. 5 shows respective reflected channel spectrums of a standard 3-port device in accordance with the present invention. The spectrum 506 shows one reflection from an optical filter configured to transmit a wavelength or a wavelength band somewhere between 1585 ~1598 nm. As shown in the spectrum 502, a signal at the wavelength or in the wavelength band does not completely transmit through the filter, introducing a residual in a reflected signal. A second reflection, as shown in the spectrum 504, reduces the residual significantly. For completeness, the transmission spectrum of the filter is shown by the spectrum 506. It can be appreciated that, in certain respect, the spectrum 504 has doubled the isolation of the spectrum 502, roughly from ~–22 dB to ~–44 dB.

The present invention may be implemented in many ways, for example, as an apparatus, a system or a method and provides flexibilities in assembling final devices. According to one embodiment of the present invention, the position of the reflective element 408 of FIG. 4 can be adjusted after the optical filter 406 is in place. The adjustment may be gradually adjusted to ensure that a reflected light beam from the optical filter 406 is reflected by the reflective element 408 back to the optical filter 406 that directs the reflected light beam to a designated port (e.g., the R-port). As a result, the stringent requirements in assembling such optical devices are much relaxed. In addition, it is appreciated by those skilled in the art that the optical devices so designed in accordance with the present invention are amenable to compact size and lower cost as there are one filter, one single fiber collimator, and one dual-fiber collimator, and a mirror.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, more reflective elements may be added to increase the times that the reflected light beam hits the same optical filter or a plurality of similar type of filters. Accordingly, the scope of the present invention is defined by the appended claims rather than the forgoing description of embodiments.

I claim:

1. An optical apparatus comprising:
   an optical filter configured to transmit a light signal at a selected wavelength;
   a first lens and a second lens, each of the lenses situated on one side of the optical filter, wherein the first lens receives a light beam including signals respectively at a plurality of wavelengths including the selected wavelength and couples the light beam to the optical filter that passes a substantial portion of the signal at the selected wavelength to the second lens;
   a reflective element receiving a reflected light beam from the optical filter, the reflected light beam including the signals at the wavelengths other than the selected wavelength and a residual signal at the selected wavelength,
   wherein the reflective element is so positioned that the reflective element is impinged upon by the reflected light beam and reflects the reflected light beam back to the optical filter such that the residual signal at the selected wavelength is further reduced by the optical filter.

2. The optical apparatus of claim 1, wherein the first collimator is a dual-fiber pigtail collimator with one fiber for receiving the light beam and another fiber for receiving the reflected signal.

3. The optical apparatus of claim 2, further including a second collimator to receive the substantial portion of the signal at the selected wavelength.

4. The optical apparatus of claim 1, wherein the reflective element is a mirror.

5. The optical apparatus of claim 4, wherein the mirror reflects the reflected light beam from the optical filter back to the optical filter such that the twice-reflected signal impinges upon the optical filter, and wherein a significant portion of the residual at the selected wavelength passes the optical filter, resulting in the reflected light beam with a much reduced residual therein.

6. The optical apparatus of claim 5, wherein the light beam is directed by the mirror to the optical filter twice.

7. The optical apparatus of claim 6, wherein the residual is minimized by causing the reflected light beam to go through the optical filter at least twice.

8. The optical apparatus of claim 1, wherein the reflective element is another optical filter having substantially identical characteristics of the optical filter.

9. The optical apparatus of claim 8, wherein the reflected light beam from the optical filter impinges upon the another optical filter that passes the residual and reflects others in the reflected light beam, as a result, the reflected signal has the residual that has been reduced by the another optical filter.

10. The optical apparatus of claim 9, wherein the reflected light beam from the another optical filter impinges upon the optical filter that again passes the reduced residual, resulting in the reflected light beam with a much reduced residual therein.

11. The optical apparatus of claim 10, wherein the light beam is directed to impinge upon the optical filter at least twice and the another filter once.

12. The optical apparatus of claim 11, wherein, when the optical filter and the another optical filter are identical, a magnitude of the residual is reduced close to be doubled in a scale of decibel.

13. A method for an optical apparatus, the method comprising:
   providing a first lens, a second lens and an optical filter configured to transmit a light signal at a selected wavelength, each of the first and second lenses situated on one side of the optical filter;
   receiving from the first lens a light beam including signals respectively at a plurality of wavelengths including the selected wavelength, the first lens coupling the light beam to the optical filter that passes a substantial portion of the signal at the selected wavelength to the second lens;
   positioning a reflective element to receive a reflected light beam from the optical filter, the reflected light beam including the signals at the wavelengths other than the selected wavelength and a residual signal at the selected wavelength,
   wherein the reflective element is so positioned with an angle that the reflected light beam is reflected back to the optical filter such that the residual signal at the selected wavelength is further reduced by the optical filter.

14. The method of claim 13, wherein the first collimator is a dual-fiber pigtail collimator with one fiber for receiving the light beam and another fiber for receiving the reflected signal.

15. The method of claim 14, further including providing a second collimator to receive the substantial portion of the signal at the selected wavelength.

16. The method of claim 13, wherein the reflective element is a mirror.

17. The method of claim 16, wherein the mirror reflects the reflected light beam from the optical filter back to the optical filter such that the twice-reflected signal impinges upon the optical filter, and wherein a significant portion of the residual at the selected wavelength passes the optical filter, resulting in the reflected light beam with a much reduced residual therein.

18. The method of claim 17, wherein the light beam is directed by the mirror to the optical filter twice.

19. The method of claim 18, wherein the residual is minimized by causing the reflected light beam to go through the optical filter at least twice.

20. The method of claim 13, wherein the reflective element is another optical filter having substantially identical characteristics of the optical filter.

21. The method of claim 20, wherein the reflected light beam from the optical filter impinges upon the another optical filter that passes the residual and reflects others in the reflected light beam, as a result, the reflected signal has the residual that has been reduced by the another optical filter.

22. The method of claim 21, wherein the reflected light beam from the another optical filter impinges upon the optical filter that again passes the reduced residual, resulting in the reflected light beam with a much reduced residual therein.

23. The method of claim 22, wherein the light beam is directed to impinge upon the optical filter at least twice and the another filter once.

24. The method of claim 23, wherein, when the optical filter and the another optical filter are identical, a magnitude of the residual being reduced is close to be doubled.

* * * * *